United States Patent [19]

Eisenbach et al.

[11] Patent Number: 5,504,157
[45] Date of Patent: Apr. 2, 1996

[54] HOMOGENEOUS POLYMER BLENDS COMPRISING RIGID ROD SHAPED POLYMERS AND FLEXIBLE POLYMERS

[75] Inventors: Claus D. Eisenbach; Karl Fischer; Jörg Hoffmann, all of Bayreuth, Germany

[73] Assignee: Bayer Aktiengesellschaft, Leverkusen, Germany

[21] Appl. No.: 370,935

[22] Filed: Jan. 10, 1995

[30] Foreign Application Priority Data

Jan. 18, 1994 [DE] Germany ............ 44 01 217.9

[51] Int. Cl.[6] ............ C08L 23/00; C08L 75/04; C08L 77/00; C08L 65/02
[52] U.S. Cl. ............ 525/127; 525/130; 525/183; 525/184; 525/185; 525/190; 525/432; 525/420; 525/424; 525/450; 525/453
[58] Field of Search ............ 525/127, 130, 525/183, 184, 185, 190, 420, 424, 432, 450, 453

[56] References Cited

U.S. PATENT DOCUMENTS

| | | | |
|---|---|---|---|
| 4,701,475 | 10/1987 | Turner | 525/123 |
| 4,719,132 | 1/1988 | Porter, Jr. | 427/409 |
| 4,861,803 | 8/1989 | Turner | 525/123 |
| 4,894,422 | 1/1990 | Peiffer et al. | 525/420 |
| 5,030,513 | 7/1991 | Hartman | 428/363 |
| 5,095,073 | 3/1992 | Peiffer et al. | 525/420 |
| 5,227,457 | 7/1993 | Marrocco, III et al. | 525/436 |

FOREIGN PATENT DOCUMENTS

| | | |
|---|---|---|
| 9304099 | 3/1993 | WIPO . |
| 9318076 | 9/1993 | WIPO . |

OTHER PUBLICATIONS

G. Menges, H. Brintrop, in "Polymere Werkstoffe", H. Batzer published by Georg Thieme Verlag, Stuttgart 1984, vol. III, p. 493.

J. L. Kardos, J. Raisoni, Polym. Eng. Sci. 15, 183 (Mar. 1975).

T. E. Helminiak, F. E. Arnold, C. L. Benner, Polymers Preprints, Amer. Chem. Soc. Polym. Chem. Div. vol. 16, 659, (Aug. 1975).

H. F. Hwang, D. R. Wiff, C. L. Benner, T. E. Helminiak, J. Macromol. Sci. Phys. B22, 231 (month unavailable–1983).

M. Takayanagi, T. Ogata, M. Morkawa, T. Kai, J. Marcromol. Sci. Phys. B14, 591 (month unavailable–1980).

S. J. Krause, W. F. Hwang, in "Polymer Based Molecular Composites", D. W. Schaefer & J. E. Mark Editors, Mat. Res. Soc. Symp. Proc., Materials Res. Soc., Pittsburgh 1990 (month unavailable) vol. 171, p. 131.

T. Heitz, P. Rohrbach, H. Höcker, Makromol. Chem. 190, 3295 (Dec. 1989).

M. Arpin, C. Strazielle, Polymer 18, 591 (Jun. 1977).

B. Jung, B. L. Schürmann, Macromolecules 22, 477 (Jan. 1989).

H. Krömer, R. Kuhn, H. Pielartzik, W. Siebke, V. Eckhardt, M. Schmidt, Macromolecules 24, 1950, Apr. 15, 1991.

*Primary Examiner*—Thomas Hamilton, III
*Attorney, Agent, or Firm*—Joseph C. Gil; Aron Preis

[57] ABSTRACT

A homogeneous polymer blend is disclosed containing components A and B. Accordingly A is about 1 to 30% by weight of a rigid, rod-shaped polymer having a persistence length of at least 10 nm and a ratio of molecular length to molecular diameter of at least 30, and B) is about 70 to 99% by weight of a flexible polymer which contains at least one member selected from the group consisting of non-ionic polar groups, ionic groups and groups convertible into ions. The flexible polymer is any one of polyolefins, polyacrylates, polyamides and polyurethanes. Component A) contains at least one chemically fixed member selected from the group consisting of non-ionic polar group, ionic group and a group convertible into ionic group, in an amount sufficient to render said A) and B) compatible one with the other.

3 Claims, No Drawings

HOMOGENEOUS POLYMER BLENDS COMPRISING RIGID ROD SHAPED POLYMERS AND FLEXIBLE POLYMERS

The invention relates to homogeneous polymer blends comprising

A) rod-shaped polymers having chemically fixed polar groups, in particular (potentially) ionic groups and B) flexible polymers which contain polar groups, wherein said A) act as reinforcing substances of said B) and wherein the per se incompatible individual components A) and B) are rendered compatible through interaction of the polar groups. By intercalation of fibers and fillers into a matrix (polymer, ceramic), so-called composites are obtained which possess a distinct improvement in strength and rigidity compared with the matrix material. Among the so-called polymer composites, the fibre-reinforced materials in particular are of great importance in research and technology; glass fibre-reinforced plastics as well as carbon fibre-reinforced plastics are used technically on a large scale. For information on the various possibilities of reinforcing polymeric materials by means of added reinforcing material and processing, and on the importance of the matrix-reinforcing material bonding to the properties of the composite, reference may be made to a general article (G. Menges, H. Brintrop, in "Polymere Werkstoffe", H. Batzer, published by Georg Thieme Verlag, Stuttgart 1984, Vol. III, page 493).

The reinforcement of the polymer matrix by, for example, intercalation of fibers (glass, carbon, metal) is based on the transfer of stress from the matrix to the fiber; the fibre has a significantly higher modulus of elasticity than the matrix. A prerequisite for a good reinforcing action is the greatest possible bonding between fibre and matrix and as high as possible a ratio of fibre length to fibre diameter (aspect ratio).

The critical fibre length is directly proportional to the fibre diameter, that is, for an effective reinforcement short fibers require smaller diameter. It has been deduced from studies of models that the modulus of elasticity of a polymer-fibre composite can be increased by up to 2 orders of magnitude by extending the fibre length or by reducing the fibre diameter (J. L. Kardos, J. Raisoni, Polym. Eng. Sci. 15, 183 (1975). From this it may be inferred that the greatest possible reinforcing effect can be achieved by rod-shaped macromolecules.

Various experiments with the so-called molecular reinforcement are described in the literature (T. E. Helminiak, F. E. Arnold, C. L. Benner, Polymer Preprints, Amer. Chem. Soc. Polym. Chem. Div., Vol. 16, 659 (1975) and H. F. Hwang, D. R. Wiff, C. L. Benner, T. E. Helminiak, J. Macromol. Sci. Phys. B22, 231 (1983)). Molecular reinforcement involves the molecularly disperse distribution of rod-shaped macromolecules in a continuous polymer matrix. But all the systems put into effect hitherto are still far removed from the ideal of the molecularly disperse distribution of the rod-shaped macromolecule in the matrix. They are as a rule small crystallites or microfibrils (diameter: 15 to 30 nm) (M. Takayanagi, T. Ogata, M. Morkawa, T. Kai, J. Macromol. Sci. Phys. B14, 591 (1980)) in the polymer matrix; the aspect ratio of 20 is significantly less than the value of approximately 100 achievable for molecular dispersion of the rod-shaped reinforcing material at an assumed molar mass $M_n$ of approximately 10 000. For a survey of the present state of the art reference may be made to the literature (S. J. Krause, W. F. Hwang, in "Polymer Based Molecular Composites", D. W. Schaefer and J. E. Mark, Editors, Mat. Res. Soc. Symp. Proc., Materials Research Society, Pittsburgh 1990, Vol. 171, page 131).

In general it has to be said that molecularly disperse distribution has not as yet been successfully achieved on account of the high incompatibility of rigid and flexible macromolecules.

This incompatibility of rod-shaped, or vermiform, macromolecules and flexible macromolecules is also the reason why extensive phase separation occurs immediately even in the systems hitherto described which most nearly approach molecular reinforcement. These systems which contain a polymer matrix reinforced by microcrystallites consisting of rigid chain macromolecules, exhibit phase separation upon melting. Thermal processing of these systems results in a loss of reinforcing effect.

The use of graft copolymers consisting of a rigid chain liquid crystal (LC)-backbone polymer as the graft foundation and a grafted matrix polymer in order to render compatible the rigid chain, liquid crystalline macromolecule (reinforcing agent) and the matrix polymer was investigated in aromatic graft copolyesters (T. Heitz, P. Rohrbach, H. Höcker, Makromol. Chem. 190, 3295 (1989). The miscibility of the LC-polyester graft copolymer with the polystyrene matrix polymer is certainly improved in comparison with the unmodified LC-polyester, however not in this case either is there molecularly disperse distribution of the LC-polymer in the polystyrene matrix, but rather it leads to the formation of liquid crystalline domains. In this connection it may be observed that here—just as in the end components for achieving a molecular reinforcement which are described in more detail above—no actual rod-shaped macromolecules were employed as blend components, but rather liquid crystalline backbone components, which display the properties of a rigid chain polymer only by parallel alignment with the formation of an anisotropic phase; these are semi-flexible chains having persistence lengths of between 7 and 17 nm, which correspond to an aspect ratio of 10 to 30 (M. Arpin, C. Strazielle, Polymer 18, 591 (1977); B. Jung., B. L. Schürmann, Macromolecules 22, 477 (1989); H. Krömer, R. Kuhn, H. Pielartzik, W. Siebke, V. Eckhardt, M. Schmidt, Macromolecules ,24, 1950 (1991)).

The object of putting into practice the concept of molecular reinforcement therefore involves overcoming the natural incompatibility of rod-shaped macromolecules with other polymers.

Surprisingly, it has now been found that homogeneous mixtures can be produced by incorporating polar groups in both components of the mixture.

The present invention therefore provides homogeneous polymer blends comprising

A) from 1 to 30% by weight of a rigid, rod-shaped polymer having a persistence length of at least 10 nm and a ratio of molecular length to molecular diameter of at least 30 and B) from 70 to 99% by weight of a flexible polymer which contains non-ionic polar groups and/or ionic groups and/or groups convertible into ions, said polymer selected from among polyolefins, polyacrylates, polyamides and polyurethanes, characterized in that the polymer A) contains chemically fixed non-ionic polar groups and/or ionic groups and/or groups convertible into ionic groups in sufficient quantity to ensure the compatibility of the components A) and B).

Compatibility in the sense of this invention means that the blends of components A) and B) do no longer exhibit the different glass transition temperatures of the single components but only one single glass transition temperature. As to the definition of the term "persistence length" see G. Porod, Monatsh. Chem. 80, 251 (1949). As to the persistence length of polydiacetylenes which are especially suitable as polymer A) see G. Wenz, M. A. Müller, M. Schmidt, G. Wegner, Macromolecules 17, 837 (1984).

The polymer blends according to the invention consist of from 1 to 30, preferably 3 to 15% by weight of rod-shaped polymers A), of the type mentioned in more detail below, and of from 70 to 99, preferably 85 to 97% by weight of flexible polymers B), which form the matrix of the systems according to the invention.

The suitable rod-shaped polymers consist of macromolecules having a persistence length of at least 10 nm, preferably at least 15 nm having an aspect ratio of at least 30. Regarding the definition and measurement of persistence length, molecular length and molecular diameter, reference may be made to the relevant literature (M. Arpin, C. Strazielle, Polymer 18, 591 (1977); B. Jung., B. L. Schürmann, Macromolecules 22, 477 (1989); H. Krömer, R. Kuhn, H. Pielartzik, W. Siebke, V. Eckhardt, M. Schmidt, Macromolecules 24, 1950 (1991)).

Suitable rod-shaped macromolecules are, for example, poly-4-hydrobenzoic acid, polyparaphenylenes, polydiacetylenes or nylon-1 in appropriately modified form.

The modification of the rod-shaped polymers involves preferably chemically fixed ionic groups, or chemically fixed potentially ionic groups, selected from the group comprising tertiary amino groups, ammonium groups, carboxylic acid groups, carboxylate groups, sulphonic acid groups and sulphonate groups. The quantity of the said chemically fixed groups is preferably from 0.1 to 1, particularly from 0.2 to 0.9 equivalents per 100 g of polymer.

Component B) of the polymer blend according to the invention is preferably flexible plastic selected from the group comprising polyolefins, polyacrylates, polyamides and polyurethanes in modified form. The modification of the said plastics likewise involves preferably chemically incorporated (potentially) ionic groups of the kind already mentioned above in connection with the component A). The polymers B) contain preferably from 0.01 to 0.7, particularly 0.02 to 0.6 equivalents of chemically fixed groups of the said type per 100 g polymer 3).

Optimal interactions between the individual components A) and B) and thereby an optimal compatibility are obtained especially when acidically modified components A) are combined with basically modified components B) or anionically modified components A) are combined with anionically modified components B). Equally good interactions are achieved using the combination of anionically modified components A) of the kind described with components B) which contain a multiplicity of non-ionic polar groups, capable of hydrogen bonding, in quantities of at least 0,15, preferably at least 0,4 equivalents per 100 g of solid. Components B) of this kind are, for example, polyamides and in particular polyurethanes. Among the preferred components B) are those which contain both (potentially) ionic groups and non-ionic polar groups such as, for example, ionically modified polyurethanes.

A particularly good interaction is achieved, among others, in the case of the combinations given in the following examples.

The polymer blends can be obtained by mixing the two polymers, preferably by coprecipitating solutions of the two polymers (identical solvents or two different solvents) in a precipitant, or by film casting from solution. Where the solvents in which each polymer is dissolved are immiscible, the polymer blend is formed at the liquid interface.

In the case of the preparation of polyurethane systems, the procedure may be conducted, for example, in such a way that a polyol component containing a carboxylate or sulphonate group is employed as the polyol component for preparing the polyurethane plastic, wherein an anionically modified component A) of the type given by way of example is dissolved or dispersed prior to the preparation of the polyurethane plastic, so that the polymer blend according to the invention is formed directly as a result of the isocyanate polyaddition reaction. Suitable ionically modified polyol components for this purpose are, for example, polyester polyols or polyether polyols containing carboxyl groups into which dimethylolpropionic acid is incorporated through urethane groups, with the incorporated carboxyl groups being neutralized with tertiary amines or alkali, or else polyether diols containing sulphonate groups, of the kind known per se from the chemistry of aqueous polyurethane dispersions. Mixtures of such ionically modified polyols with unmodified polyols, in particular polyether polyols or polyester polyols of the kind known per se from polyurethane chemistry may, of course, also be used. It is however also possible to dispense with an ionic modification of the polyol component provided that, by suitably selecting the type of starting materials employed for the formation of polyurethane, polar urethane groups and optionally urea groups capable of hydrogen bridging are incorporated in a quantity such that the interaction essential for the invention with the component A) is ensured.

The polymer blends in accordance with the invention represent flexible polymers having improved mechanical properties and may be used in all fields of application of flexible plastics especially in the automotive industrie.

EXAMPLES

Polymers A

The polydiacetylenes modelled as rod-shaped macromolecules which where used as blend components A) where prepared in accordance with the directions in the literature (see G.N. Patel et al. J. Polym. Sci Polym. Symp. 71, 247 (1984)). They correspond to the general formula

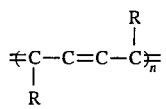

Polymer A1)

Polymer in accordance with the above formula R standing for $-(CH_2)_3-COOH$ and n standing for a number greater than 50. Persistence length: about 18 nm; aspect ratio: about 75.

Polymer A1) contains 0,9 aquivalents of carboxyl groups per 100 g.

Polymer A2)

Potassum salt of polymer A1 obtained by dissolving A1) in an equivalent amount of aqueous 0,1 m KOH and subsequent evaporation of the water under vacuum. Polymer A2) contains 0,77 equivalents of carboxylate groups per 100 g.

Polymer A3)

Triethyl ammonium salt of polymer A1) obtained by dissolving polymer A1) in a saturated aqueous solution of triethyl amine with subsequent evaporation of the water and drying under vacuum. Polymer A3) contains 0,47 equivalents of carboxylate groups per 100 g.

Polymer A4)

Polymer in accordance with the above formula with R standing for a radical of the formula

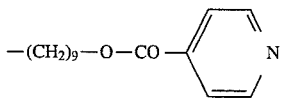

and with n standing for about 75 having a persistence length of about 18 nm and an aspect ratio of about 75. Polymer A4) contains 0,35 equivalents of nitrogen atoms per 100 g.

Flexible polymers B)

Polymer B1)

Copolymer of styrene and 4-vinyl benzoic acid containing 0,23 equivalents of carboxylic acid groups per 100 g.

Polymer B2)

Potassium salt of B1) containing 0,21 equivalents of carboxylate groups per 100 g.

Polymer B3)

Triethylammonium salt of B1) containing 0,18 equivalents of carboxylate groups per 100 g.

Polymer B4)

Copolymer of styrene and styrene-4-sulfonic acid containing 0,08 equivalents of sulfonic acid groups per 100 g.

Polymer B5)

Aqueous dispersion of a polyester urethane having a solids content of 40 percent by weight prepared from 1,0 mol of a polyester diol (molecular weight: 1700) prepared from adipic acid and an equimolar mixture of 1,6-hexandiol and neopentyl glycol 1,8 moles of hexamethylene diisocyanate 0,25 moles of the sodium salt of the diamino sulfonic acid of the formula $H_2N-CH_2-CH_2-NH-CH_2-CH_2-SO_3H$ 0,2 moles of ethylendiamine in accordance with German patent 14 95 847. Polymer B5) contains 0,011 equivalents of sulphonate groups and 0,18 equivalents of non-ionic polar groups per 100 g.

Polymer B6)

Polyurethane containing free sulphonic acid groups obtained by adding 10 parts by volume of water to 1 part by volume of dispersion B5) and subsequent addition of concentrated hydrochloric acid until coagulation occurs. After stirring at room temperature for 3 h the precipitated polymer is filtrated, washed with water and dried under vacuum.

Polymer B7)

Polyurethane containing 0,023 equivalents of sulfonic acid groups and 0,18 equivalents of non-ionic polar groups per 100 g obtained in analogie to B6) the only difference consisting in the use of additional 0,2 moles of the sodium salt of the diaminosulfonic acid instead of the 0,2 moles of ethylene diamine.

Polymer B8)

Polyurethane obtained by reacting equimolar amounts of 4,4'-diisocyanatodiphenylmethane and butane-1,4-diol at 220° C. in an extruder containing 0,59 equivalents of polar groups (urethane groups) per 100 g

Blends I–IV

1% by wt. solutions of polymer A4) in chloroform are added at room temperature to 3% by wt. solutions of polymers B6) resp. B7) in chloroform. After 1 h stirring at room temperature the solvent is evaporated and the resulting transparent film dried at 50° C. under vacuum. The precise composition of blends I–IV and their properties are listed in the table below.

Blend V 50 mg of polymer A2) dissolved in 2 ml of water are slowly added at room temperature under vigorous stirring to 500 mg of polymer B8) dissolved in 20 ml of dimethyl formamide (DMF). After stirring for 3 h the combined solution is added to 150 ml of benzene with precipitation of the blend. The precipitate is washed with benzene and freeze-dried twice under vacuum. Its properties are set forth in the table below.

Blend VI

Blend VI is prepared by dropwise addition of an aqueous solution of polymer A2) to a solution of polymer B2) in methanol. After stirring for 1 day at room temperature water and methanol are evaporated with subsequent drying of the blend under vacuum. The presice composition of the blend and its properties are listed in the table below.

Blend VII

Polymer A4) and polymer B4) are each dissolved separately in chloroform. The solution of A4) is then added dropwise under stirring at room temperature to the solution of B4). The gel-like layer formed on the chloroform-phase is isolated and dried under vacuum.

TABLE

| Blends | % by weight A | % by weight B | E-modulus [M PA] | elongation [%] |
|---|---|---|---|---|
| I | 6 A-4 | 94 B-6 | 1.87 | 700 |
| II | 3 A-4 | 97 B-6 | 1.52 | 700 |
| III | 6 A-4 | 94 B-7 | 1.46 | 700 |
| IV | 3 A-4 | 97 B-7 | 0.72 | 160 |
| V | 9,1 A-2 | 90,9 B-8 | 446 | 5 |
| Ia* | — | 100 B-6 | 0.71 | 700 |
| IIIa* | — | 100 B-7 | 0.17 | 600 |
| Va* | — | 100 B-8 | 399 | 3,5 |

| Blends | % by weight A | % by weight B | glass transition temp. [°C.] |
|---|---|---|---|
| VI | 20 A-2 | 80 B-2 | 121 |

TABLE-continued

| | | | |
|---|---|---|---|
| VIA* | 100 A-2 | — | 65 |
| VIB* | — | 100 B-2 | 144 |
| VII | 18.5 A-4 | 81.5 B-4 | 109 |
| VIIA* | 100 A-4 | — | 80 |
| VIIB* | — | 100 B-4 | 114 |

*comparison examples

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A homogeneous polymer blend comprising
    A) about 1 to 30% by weight of a rigid, rod-shaped polymer having a persistence length of at least 10 nm and a ratio of molecular length to molecular diameter of at least 30 and
    B) about 70 to 99% by weight of a flexible polymer which contains at least one member selected from the group consisting of ionic groups and groups convertible into ions, said flexible polymer selected from the group consisting of polyolefins, polyacrylates, polyamides and polyurethanes,
    characterized in that said A) contains an amount of at least one chemically fixed member selected from the group consisting of ionic group and a group convertible into ionic group, said amount being sufficient to render said A) and B) compatible one with the other.

2. The homogeneous polymer blend of claim 1, characterized in that said A) contains from 0.1 to 1.0 equivalents per 100 g of solid of chemically incorporated member selected from the group consisting of tertiary amino groups, ammonium groups, carboxylic acid groups, carboxylate groups, sulphonic acid groups and sulphonate groups and in that said B) contains from 0.01 to 0.7 equivalents per 100 g of solid of chemically incorporated member selected from the group consisting of tertiary amino groups, ammonium groups, carboxylic acid groups, carboxylate groups, sulphonic acid groups and sulphonate groups.

3. The homogeneous blend of claim 1 wherein said flexible polymer is polyurethane.

* * * * *